Dec. 13, 1960 R. NOIR 2,964,292
FLUIDTIGHT VALVE
Filed May 23, 1956
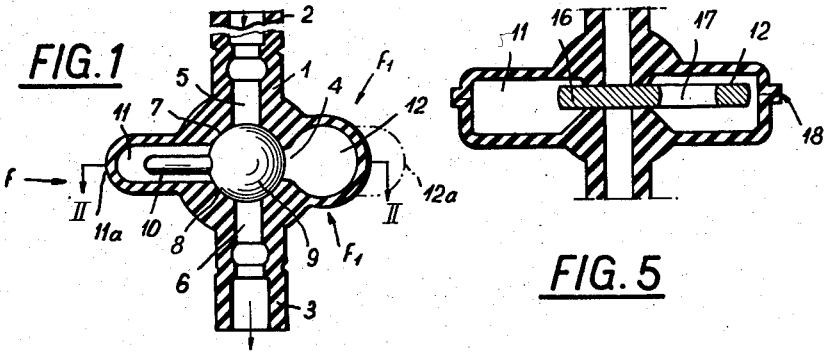
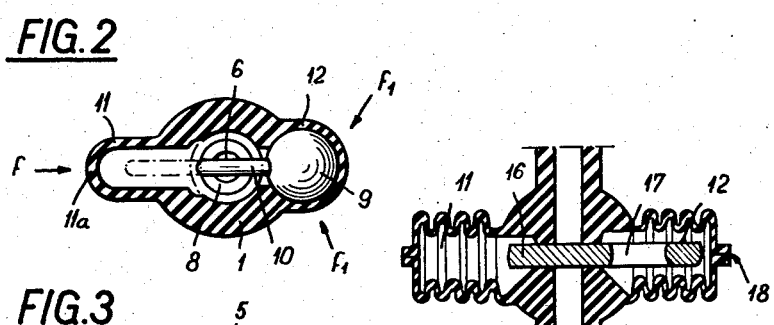
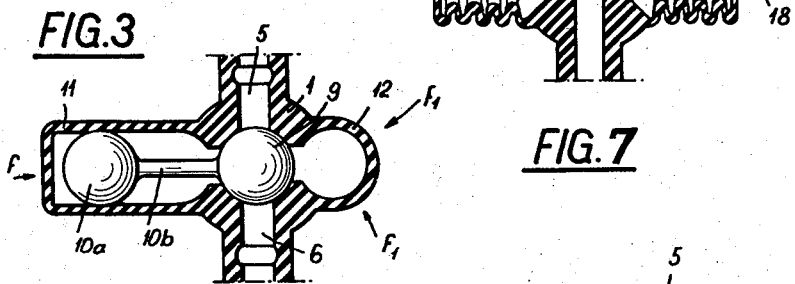
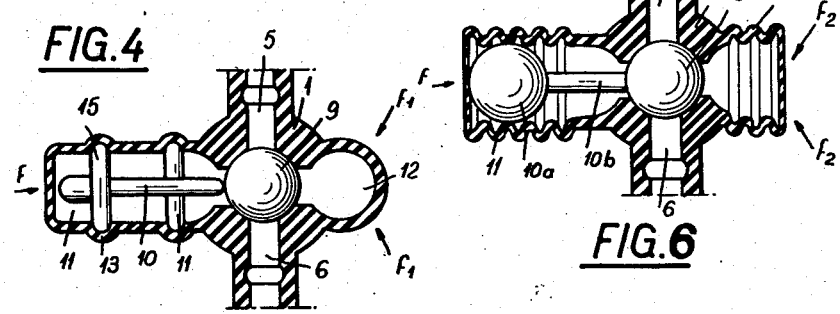
Inventor:
René NOIR
by J. Dellatre Seguy
Attorney

United States Patent Office 2,964,292
Patented Dec. 13, 1960

2,964,292

FLUIDTIGHT VALVE

René Noir, 17, rue Louise Michel, Levallois-Perret, France

Filed May 23, 1956, Ser. No. 586,792

Claims priority, application France May 25, 1955

1 Claim. (Cl. 251—342)

Whereas in conventional valves, corks, and the like closing means for fluid channels, it is comparatively easy to provide satisfactory fluidtightness, the case is not the same for the handle, spigot, tumbler or the like controlled valves.

My invention has for its object a valve system which provides a satisfactory fluidtightness not only for the actual valve body but also for the member controlling it.

According to my invention, the controlled member constituted by the valve body and the controlling member are both enclosed inside a unitary fluidtight pipe of yielding material provided to either side of a central channel with lateral chambers in register with each other, one of said chambers containing the controlling member so that it may be handled from the outside of the pipe and shifted out of its chamber to urge the valve body also enclosed in said pipe out of its operative position, for which said valve body engages the central channel in the section registering with the two lateral chambers and closes fluidtightly both output ends of said section, through an elastic deformation of the lips defining said output ends: When the valve body thus is urged out of its operative into its inoperative position, it occupies the other lateral chamber opposed to the first mentioned lateral chamber.

Such an arrangement is of considerable interest in pipes conveying a fluid or between a container and a pipe or again for closing a bottle or the like container or pipe opening into the atmosphere. It is applicable in particular for the conveyance of dangerous, noxious or explosive fluids as well as for the closing of beverage-containing bottles.

I have illustrated by way of example in the accompanying drawings several embodiments of my invention. In said drawings:

Fig. 1 is a longitudinal sectional view of a first embodiment of my improved valve.

Fig. 2 is a cross-section through line II—II of Fig. 1.

Figs. 3, 4 and 5 illustrate further embodiments of my invention in longitudinal sectional view.

Figs. 6 and 7 illustrate modifications, also in longitudinal view of the embodiments according to Figs. 3 and 5 respectively.

The valve illustrated in Figs. 1 and 2 includes a yielding unitary casing 1 of molded material including at its ends pipe sections 2 and 3 through which it may be connected with a supply of fluid on the one hand, and on the other hand with a pipe or utilization container.

In the central section of the body 1 is provided a central chamber 4 connected through openings 5 and 6 with the terminal pipe sections 2 and 3, said openings extending beyond the seats 7 and 8 constituted for the active valve body, a ball 9 in the case considered. Said ball 9 is rigid with a control member 10 in the form of a push rod. To either side of the central chamber 4 adapted to house the ball 9 are provided, in registry with and opening into said chamber 4, two lateral chambers formed in the yielding casing. One of said chambers illustrated at 11 is adapted to enclose with a large clearance the control member 10 while the other lateral chamber 12 has an inner shape matching substantially that of the control valve body, to wit a spherical shape in the case considered.

The central section of the tubular member 1 and/or the ball 9 may be made of yielding material.

The operation of the valve described is as follows:

When, as illustrated in Fig. 1, the valve body 9 is in its central position inside the chamber 4, the openings 5 and 6 are closed. Assuming the fluid arriving through the pipe section 2 is subjected to an even low pressure, fluidtightness is ensured by the seat 7. If any leak arises along said seat, the fluidtightness is then ensured on the further seat 8 under the action of the pressure prevailing in the lateral chambers 11 and 12 and inside the pipe section 2 which pressure acts throughout the operative surface of the ball.

Obviously the ratio between the cross-section of the pipe openings 5 and 6 and the volume of the chambers 11 and 12 may be selected as desired within a large range of values.

For opening the valve, it is sufficient to act on the outside of the outer end 11a of the chamber 11, i.e. in the direction of the arrow f. The pressure thus exerted is transmitted to the ball 9 through the push rod or member 10 and the ball is driven into the chamber 12 so as to open the passage between the pipe openings 5 and 6 (Fig. 2).

The chamber 12 may extend further to the right hand side of Fig. 1 as shown at 12a so as to allow the ball 9 and the push member to be both completely collapsed within said extended chamber.

When it is desired to close the valve, it is sufficient to exert a pressure on the wall of the chamber 12 as illustrated by the arrows f. This drives out the ball 9 which returns into its operative position between its seats 7 and 8, i.e. between the pipe openings 5 and 6 while the control or push member 10 returns into the lateral chamber 11.

The valve which has been described is preferably made at least partly or yielding or semi-yielding material such as rubber or the like moldable plastic material. The ball 9 may for instance also be made of semi-yielding possibly hardened material such as rubber, plastic material or even of metal.

The selection of material which forms the different components depends partly on the nature and on the properties of the fluid to be controlled.

The insertion of the valve in a fluid channel may be performed in any suitable or known manner through fitting, screwing or the like.

In the modified embodiment illustrated in Fig. 3, the valve 9 which is again constituted by a ball is operatively connected with a control ball 10a through a short rod 10b rigid with both balls. The walls of the chambers 11 and 12 may be made either of semi-rigid material as illustrated in Fig. 3 or else of a more yielding material shaped after the manner of bellows as illustrated in Fig. 6.

The operation is similar to that which has been described hereinabove, the opening of the valve being executed under the action of pressure exerted in the direction of the arrow f while the closing is executed in the opposite direction by exerting pressure in the direction of the arrow f1 in the case of a semi-rigid chamber or in the direction of the arrow f2 in the case of bellows (Fig. 6).

In the arrangement illustrated in Fig. 4, the valve body 9 instead of being rigid with the push member 10 is independent of the latter which is housed inside a lateral chamber 11 having semi-rigid walls or again inside a bellow-shaped chamber, said lateral chamber being provided with two inner peripheral grooves extending in planes perpendicular to its axis as illustrated at 13 and 14. The push member 10 is rigid with a transverse disc or collar 15 adapted to engage selectively either of said grooves according to the position to be given to the push member. As precedingly, the valve is controlled through pressure exerted according to the case in the direction of the arrow $f$ or $f1$.

In the arrangement illustrated in Fig. 5, the valve is is constituted no longer by a ball but by a flat slide 16 provided with a transverse port 17 near one of its ends. The chambers 11 and 12 which are symmetrically shaped are made of semi-rigid material or else of bellow shape (Fig. 7). This arrangement is conveniently executed through the assembly to either side of a joint 18 of two shells which may be similar to each other or different.

My invention is applicable to the fluidtight mounting of closing members for fluid carrying channels of any known type such as those controlled by a push member, a rocking member, a tumbler, a spigot or the like.

Obviously many modifications may be brought to the arrangement described without widening thereby the scope of the invention as defined hereinafter in the accompanying claim. Thus the shape of the valve body is not limited to the flat and spherical shapes illustrated and the valve body may as well be cylindrical, conical or assume any other desired shape.

What I claim is:

A valve system for controlling a fluid feeding pipe comprising: two pipe sections, a unitary fluid tight member of yielding material located between said pipe sections and separating the latter from each other and provided with three entirely closed interconnected aligned chambers including a central chamber, two lateral elongated chambers both projecting beyond said pipe sections and opening between two opposed seats into the central chamber and with two channels each extending through one of said seats, said channels connecting two diametrically opposed points of the central chamber with the corresponding pipe sections and a valve enclosed entirely in the space defined by said three chambers and including a solid ball normally extending across the central chamber and engaging the seats therein to close the channels with reference to each other and shiftable out of its seat-engaging position into one of the lateral chambers and out of the latter back into its seat-engaging position and a pusher rigid with the ball and shiftable out of the other lateral chamber into the central chamber upon manual application of pressure from the outside of the yielding member to thereby shift the ball out of its seat-engaging position and open the connection between the channels, manual application of pressure on the wall of said one lateral chamber urging the ball when inside said one chamber back into the central chamber and thereby the pusher back into said other lateral chamber.

References Cited in the file of this patent

UNITED STATES PATENTS

| | | |
|---|---|---|
| 1,602,047 | Schultheis | Oct. 5, 1926 |
| 1,669,568 | McGee | May 15, 1928 |
| 1,880,948 | Evennett | Oct. 4, 1932 |
| 2,440,943 | Gonsett et al. | May 4, 1948 |
| 2,691,988 | Weatherhead | Oct. 19, 1954 |

FOREIGN PATENTS

| | | |
|---|---|---|
| 897,567 | France | May 30, 1944 |